(12) United States Patent
Suzuki et al.

(10) Patent No.: US 11,219,007 B2
(45) Date of Patent: Jan. 4, 2022

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Shoichi Suzuki, Sakai (JP); Tomoki Yoshimura, Sakai (JP); Wataru Ouchi, Sakai (JP); Taewoo Lee, Sakai (JP); Liqing Liu, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 69 days.

(21) Appl. No.: 16/627,418

(22) PCT Filed: Jul. 3, 2018

(86) PCT No.: PCT/JP2018/025191
§ 371 (c)(1),
(2) Date: Dec. 30, 2019

(87) PCT Pub. No.: WO2019/009283
PCT Pub. Date: Jan. 10, 2019

(65) Prior Publication Data
US 2020/0154410 A1 May 14, 2020

(30) Foreign Application Priority Data
Jul. 3, 2017 (JP) .............................. JP2017-130303

(51) Int. Cl.
*H04W 4/00* (2018.01)
*H04W 72/04* (2009.01)

(52) U.S. Cl.
CPC ...... *H04W 72/042* (2013.01); *H04W 72/0413* (2013.01)

(58) Field of Classification Search
CPC ............ H04W 72/042; H04W 72/0413; H04L 5/0046; H04L 5/0055; H04L 5/0057; H04L 1/001
See application file for complete search history.

(56) References Cited

U.S. PATENT DOCUMENTS

2009/0185638 A1 7/2009 Imamura et al.
2009/0296644 A1 12/2009 Cheon et al.
(Continued)

FOREIGN PATENT DOCUMENTS

| EP | 2 395 693 A2 | 12/2011 |
| JP | 2011-526094 A | 9/2011 |
| WO | 2007/136002 A1 | 11/2007 |

OTHER PUBLICATIONS

Huawei et al., "Further details for PT-RS design", 3GPP TSG RAN WG1 Meeting #88b, R1-1704240, Apr. 3-7, 2017, 5 pages.
(Continued)

*Primary Examiner* — Bo Hui A Zhu
(74) *Attorney, Agent, or Firm* — Keating & Bennett, LLP

(57) ABSTRACT

A terminal apparatus includes a receiver configured to receive a PDCCH including downlink control information used for scheduling of a PUSCH, a coding unit configured to encode uplink control information, and a transmitter configured to transmit the uplink control information by using the PUSCH. A coding rate R and a modulation order $Q_m$ are given based on one field included in the downlink control information. The number Q of coded bits of the uplink control information is given at least based on the number Q' of coded modulation symbols for the uplink control information and the modulation order $Q_m$. The
(Continued)

number Q' of coded modulation symbols is given at least based on the coding rate R and the modulation order $Q_m$.

12 Claims, 13 Drawing Sheets

(56) References Cited

U.S. PATENT DOCUMENTS

| | | | |
|---|---|---|---|
| 2011/0299500 A1* | 12/2011 | Papasakellariou | H04B 7/0413 370/330 |
| 2013/0114391 A1 | 5/2013 | Jang et al. | |
| 2015/0249984 A1 | 9/2015 | Papasakellariou et al. | |

OTHER PUBLICATIONS

Official Communication issued in International Patent Application No. PCT/JP2018/025191, dated Sep. 25, 2018.
"3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, pp. 1-142.
"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0, Dec. 2015, pp. 1-121.
"3rd Generation Partnership Project; Technical Specification Group Radio Access Network; Evolved Universal Terrestrial Radio Access (E-UTRA); Physical layer procedures (Release 13)", 3GPP TS 36.213 V13.0.0, Dec. 2015, pp. 1-326.
"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0, Dec. 2015, pp. 1-82.
"3rd Generation Partnership Project; Technical Specification Group Radio Access Network; Evolved Universal Terrestrial Radio Access (E-UTRA);Radio Resource Control (RRC); Protocol specification (Release 13)", 3GPP TS 36.331 V13.0.0, Dec. 2015, pp. 1-507.
Ericsson, "On MCS/transport Block Size Determination", 3GPP TSG RAN WG1 NR Ad-Hoc#2, R1-1711501, Jun. 27-30, 2017, pp. 1-10.
Samsung, "Transport block size determination", 3GPP TSG RAN WG1 NR Ad-Hoc#2, R1-1710720, Jun. 27-30, 2017, pp. 1-3.
Papasakellariou, "Reliability Enhancements for Control Signaling or Data Signaling", U.S. Appl. No. 62/509,831, filed May 23, 2017.
Intel Corporation, "UCI multiplexing onto PUSCH", 3GPP TSG RAN WG1 NR Ad-Hoc#2, R1-1710558, Jun. 27-30, 2017, 5 pages.
Huawei et al., "On transmission of UCI on PUSCH", 3GPP TSG RAN WG1 Meeting #89, R1-1706958, May 15-19, 2017, 4 pages.
Nokia et al., "On Details of the PT-RS Design for DFT-s-OFDM", 3GPP TSG RAN WG1 NR Ad-Hoc#2, R1-1711631, Jun. 27-30, 2017, 7 pages.

* cited by examiner

| | |
|---|---|
| (k, l) | RESOURCE ELEMENT WITH FREQUENCY DOMAIN INDEX k AND TIME DOMAIN INDEX l |
| k | SUBCARRIER INDEX/FREQUENCY DOMAIN INDEX |
| l | SC-FDMA SYMBOL OR OFDM SYMBOL INDEX/TIME DOMAIN INDEX |
| $n_{PRB}$ | PHYSICAL RESOURCE BLOCK NUMBER IN FREQUENCY DOMAIN |
| v | NUMBER OF LAYERS |
| C | NUMBER OF CODE BLOCKS FOR TRANSPORT BLOCK |
| C' | VIRTUAL NUMBER OF CODE BLOCKS FOR VIRTUAL TRANSPORT BLOCK |
| $K_r$ | r-th CODE BLOCK SIZE INCLUDING CRC PARITY BITS |
| $K'_r$ | VIRTUAL r-th CODE BLOCK SIZE INCLUDING CRC PARITY BITS |
| L | CRC PARITY BITS FOR HARQ-ACK, TYPE A CSI, OR TYPE B CSI |
| $M_{sc}$ | BANDWIDTH SCHEDULED FOR PUSCH TRANSMISSION IN CURRENT SLOT FOR TRANSPORT BLOCK, EXPRESSED AS NUMBER OF SUBCARRIERS |
| $M_{sc\ initial}$ | BANDWIDTH SCHEDULED FOR PUSCH INITIAL TRANSMISSION FOR SAME TRANSPORT BLOCK, EXPRESSED AS NUMBER OF SUBCARRIERS |
| $N_{PTRS}$ | NUMBER OF RESOURCE ELEMENTS FOR PTRS FOR PUSCH TRANSMISSION IN CURRENT SLOT FOR TRANSPORT BLOCK |
| $N_{PTRS\ initial}$ | NUMBER OF RESOURCE ELEMENTS FOR PTRS FOR PUSCH INITIAL TRANSMISSION FOR SAME TRANSPORT BLOCK |
| $N_{RE}$ | NUMBER OF RESOURCE ELEMENTS ALLOCATED FOR PUSCH |
| $N^{virtual}_{RE}$ | VIRTUAL NUMBER OF RESOURCE ELEMENTS ALLOCATED FOR PUSCH |
| $N_{symb}$ | NUMBER OF SC-FDMA SYMBOLS OR OFDM SYMBOLS FOR PUSCH TRANSMISSION IN CURRENT SLOT FOR TRANSPORT BLOCK |
| $N_{symb\ initial}$ | NUMBER OF SC-FDMA SYMBOLS OR OFDM SYMBOLS FOR PUSCH INITIAL TRANSMISSION FOR SAME TRANSPORT BLOCK |
| $N^{RB}_{sc}$ | RESOURCE BLOCK SIZE IN FREQUENCY DOMAIN, EXPRESSED AS NUMBER OF SUBCARRIERS |
| $N^{UL}_{RB}$ | UPLINK BANDWIDTH CONFIGURATION, EXPRESSED AS MULTIPLE OF $N^{RB}_{sc}$ |
| $N^{UL}_{symb}$ | NUMBER OF SC-FDMA SYMBOLS OR OFDM SYMBOLS IN SLOT |

FIG. 1

| | |
|---|---|
| O | NUMBER OF HARQ-ACK BITS, NUMBER OF TYPE A CSI BITS, OR NUMBER OF TYPE B CSI BITS |
| $Q_{ACK}$ | NUMBER OF CODED BITS FOR HARQ-ACK |
| $Q_{CSI\_A}$ | NUMBER OF CODED BITS FOR TYPE A CSI |
| $Q_{CSI\_B}$ | NUMBER OF CODED BITS FOR TYPE B CSI |
| $Q_m$ | MODULATION ORDER |
| $Q'_{ACK}$ | NUMBER OF CODED MODULATION SYMBOLS FOR HARQ-ACK |
| $Q'_{CSI\_A}$ | NUMBER OF CODED MODULATION SYMBOLS FOR TYPE A CSI |
| $Q'_{CSI\_B}$ | NUMBER OF CODED MODULATION SYMBOLS FOR TYPE B CSI |
| R | TARGET CODING RATE |
| TBS | TRANSPORT BLOCK SIZE |
| $TBS_{temp}$ | TEMPORARY TRANSPORT BLOCK SIZE |
| $TBS^{virtual}$ | VIRTUAL TRANSPORT BLOCK SIZE |
| $TBS^{virtual}_{temp}$ | VIRTUAL TEMPORARY TRANSPORT BLOCK SIZE |

FIG. 2

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2017-130303 filed on Jul. 3, 2017, the contents of which are incorporated herein by reference.

BACKGROUND ART

A radio access method and a radio network for cellular mobile communications (hereinafter referred to as "Long Term Evolution (LTE: Trade name)", or "Evolved Universal Terrestrial Radio Access (EUTRA)") have been studied in the 3rd Generation Partnership Project (3GPP) (NPLs 1, 2, 3, 4, and 5). In 3GPP, a new radio access method (hereinafter referred to as "New Radio (NR)") has been studied. In LTE, a base station apparatus is also referred to as an evolved NodeB (eNodeB). In NR, a base station apparatus is also referred to as a gNodeB. In LTE and in NR, a terminal apparatus is also referred to as a User Equipment (UE). LTE, as well as NR, is a cellular communication system in which multiple areas are deployed in a cellular structure, with each of the multiple areas being covered by a base station apparatus. A single base station apparatus may manage multiple cells.

In LTE, a terminal apparatus 1 may transmit uplink control information by using a PUSCH including a transport block (NPL 3). In LTE, a transport block size may be determined based on an MCS index, the number v of layers, and the number $N_{RB}$ of resource blocks allocated for PUSCH transmission in the frequency domain (NPL 3).

For NR, determination of a transport block size, based on a modulation order $Q_m$, a target coding rate R, the number v of layers, the number $N_{RB}$ of allocated resource blocks in the frequency domain, and the number $N^{UL\_PRB}_{RE}$ of REs per PRB per slot/mini-slot, has been studied (NPL 6). A terminal apparatus 1 reads a modulation order $Q_m$ and a target coding rate R by using a received MCS index.

In NPL 7, determination of a transport block size per layer, based on a modulation order $Q_m$, a target coding rate R, and the number of allocated REs, is proposed.

CITATION LIST

Non Patent Literature

NPL 1: "3GPP TS 36.211 V13.0.0 (2015-12)", 6 Jan. 2016.

NPL 2: "3GPP TS 36.212 V13.0.0 (2015-12)", 6 Jan. 2016.

NPL 3: "3GPP TS 36.213 V13.0.0 (2015-12)", 6 Jan. 2016.

NPL 4: "3GPP TS 36.321 V13.0.0 (2015-12)", 14 Jan. 2016.

NPL 5: "3GPP TS 36.331 V13.0.0 (2015-12)", 7 Jan. 2016.

NPL 6: "On MCS/transport Block Size Determination", R1-1711501, Ericsson, 3GPP TSG RAN WG1 NR Ad-Hoc#2, Qingdao, P.R. China, 27-30 Jun. 2017.

NPL 7: "Transport block size determination", R1-1710720, Samsung, 3GPP TSG RAN WG1 NR Ad-Hoc #2, Qingdao, P.R. China, 27-30 Jun. 2017.

SUMMARY OF INVENTION

Technical Problem

One aspect of the present invention provides a terminal apparatus, a communication method used for the terminal apparatus, a base station apparatus, and a communication method used for the base station apparatus. The terminal apparatus, the communication method used for the terminal apparatus, the base station apparatus, and the communication method used for the base station apparatus of the present invention include a method of efficiently determining the size of information, and/or a method of efficiently determining the number of modulation symbols/coded symbols/resource elements for the information. Here, the information may include at least a part or all of data, control information, and a reference signal.

Solution to Problem (1) According to some aspects of the present invention, the following measures are provided. Specifically, one aspect of the present invention is a terminal apparatus including: a receiver configured to receive a PDCCH including downlink control information used for scheduling of a PUSCH; a coding unit configured to encode uplink control information; and a transmitter configured to transmit the uplink control information by using the PUSCH, wherein a coding rate R and a modulation order $Q_m$ are given based on one field included in the downlink control information, the number Q of coded bits of the uplink control information is given at least based on the number Q' of coded modulation symbols for the uplink control information and the modulation order $Q_m$, and the number Q' of coded modulation symbols is given at least based on the coding rate R and the modulation order $Q_m$.

(2) One aspect of the present invention is a base station apparatus including: a transmitter configured to transmit a PDCCH including downlink control information used for scheduling of a PUSCH; a receiver configured to receive uplink control information by using the PUSCH; and a decoding unit configured to decode the uplink control information, wherein a coding rate R and a modulation order $Q_m$ are given based on one field included in the downlink control information, the number Q of coded bits of the uplink control information is given at least based on the number Q' of coded modulation symbols for the uplink control information and the modulation order $Q_m$, and the number Q' of coded modulation symbols is given at least based on the coding rate R and the modulation order $Q_m$.

(3) One aspect of the present invention is a communication method used for a terminal apparatus, the communication method including: receiving a PDCCH including downlink control information used for scheduling of a PUSCH; encoding uplink control information; and transmitting the uplink control information by using the PUSCH, wherein a coding rate R and a modulation order $Q_m$ are given based on one field included in the downlink control information, the number Q of coded bits of the uplink control information is given at least based on the number Q' of coded modulation symbols for the uplink control information and the modulation order $Q_m$, and the number Q' of coded modulation symbols is given at least based on the coding rate R and the modulation order $Q_m$.

(4) One aspect of the present invention is a communication method used for a base station apparatus, the communication method including: transmitting a PDCCH including downlink control information used for scheduling of a PUSCH; receiving uplink control information by using the PUSCH; and decoding the uplink control information, wherein a coding rate R and a modulation order $Q_m$ are given based on one field included in the downlink control information, the number Q of coded bits of the uplink control information is given at least based on the number Q' of coded modulation symbols for the uplink control information and the modulation order $Q_m$, and the number Q' of coded modulation symbols is given at least based on the coding rate R and the modulation order $Q_m$.

Advantageous Effects of Invention

According to one aspect of the present invention, the terminal apparatus can efficiently perform uplink transmission. The base station apparatus can efficiently receive the uplink transmission.

BRIEF DESCRIPTION OF DRAWINGS

FIG. 1 is a diagram illustrating symbols according to the present embodiment.
FIG. 2 is a diagram illustrating symbols according to the present embodiment.

DESCRIPTION OF EMBODIMENTS

Figure 3:
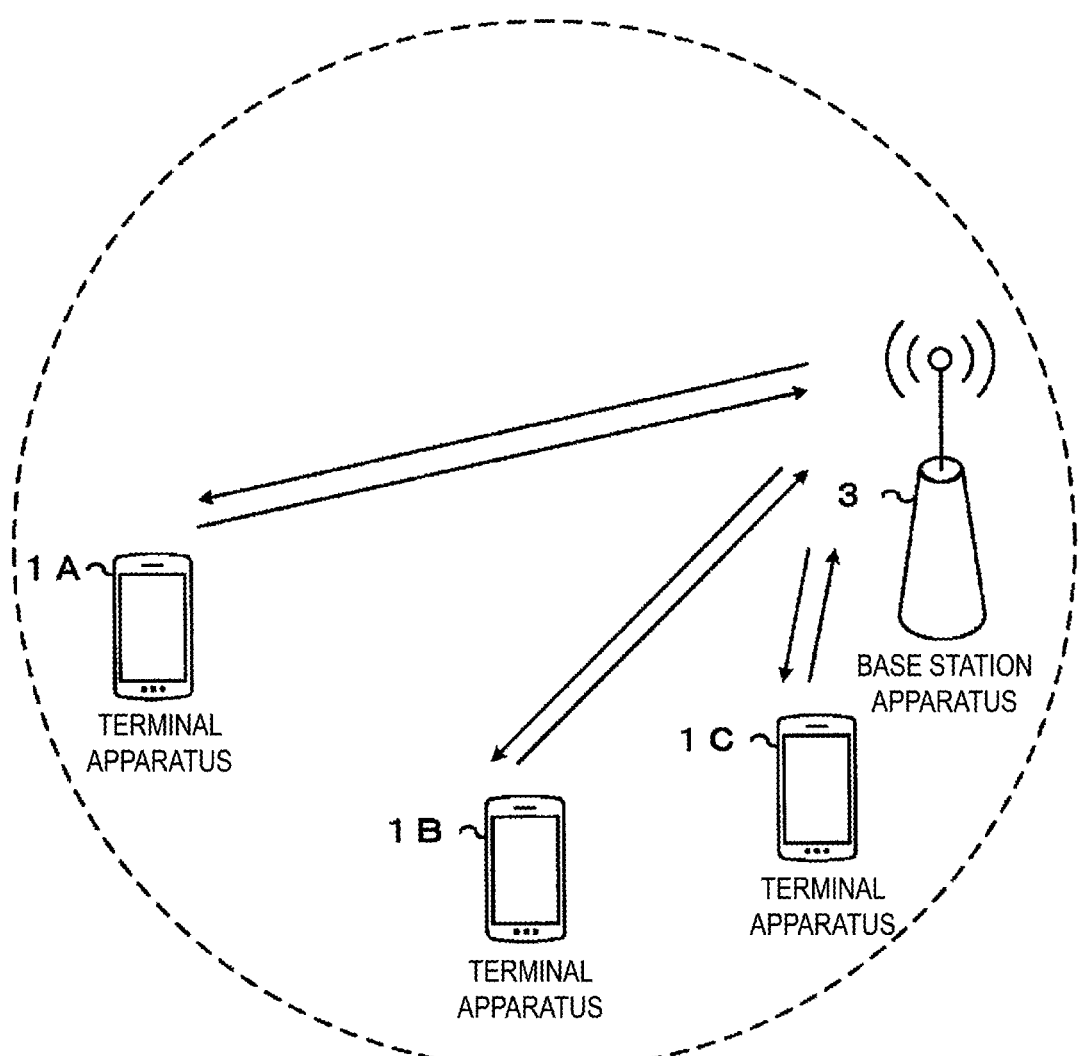
FIG. 3 is a conceptual diagram of a radio communication system according to the present embodiment.

Embodiments of the present invention will be described below.
FIG. 1 and FIG. 2 are diagrams illustrating symbols according to the present embodiment.
FIG. 3 is a conceptual diagram of a radio communication system according to the present embodiment. In FIG. 3, a radio communication system includes terminal apparatuses 1A to 1C and a base station apparatus 3. Hereinafter, each of the terminal apparatuses 1A to 1C are referred to as a terminal apparatus 1.

Carrier aggregation will be described below.
In the present embodiment, one or multiple serving cells are configured for the terminal apparatus 1. A technology in which the terminal apparatus 1 communicates via multiple serving cells is referred to as cell aggregation or carrier aggregation. One aspect of the present invention may be applied to each of the multiple serving cells configured for the terminal apparatus 1. Furthermore, one aspect of the present invention may be applied to some of the multiple serving cells configured. The multiple serving cells include at least one primary cell. Here, the multiple serving cells may include at least one of multiple secondary cells.
The primary cell is a serving cell in which an initial connection establishment procedure has been performed, a serving cell in which a connection re-establishment procedure has been started, or a cell indicated as a primary cell in a handover procedure. The secondary cell may be configured at a point of time when or after a Radio Resource Control (RRC) connection is established.
A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.
The terminal apparatus 1 can simultaneously perform transmission and/or reception of multiple physical channels on multiple serving cells (component carriers). One physical channel is transmitted on one serving cell (component carrier) of multiple serving cells (component carriers).
Physical channels and physical signals according to the present embodiment will be described.
In uplink radio communication from the terminal apparatus 1 to the base station apparatus 3, the following uplink physical channels are used. The uplink physical channels are used for transmitting information output from a higher layer.
Physical Uplink Control Channel (PUCCH)
Physical Uplink Shared Channel (PUSCH)
Physical Random Access Channel (PRACH)
The PUCCH is used for transmitting CSI (Channel State Information) of downlink, and/or, HARQ-ACK (Hybrid Automatic Repeat reQuest). The CSI, as well as the HARQ-ACK, is Uplink Control Information (UCI).
The PUSCH is used for transmitting uplink data (Transport block, Uplink-Shared Channel (UL-SCH)), the CSI of downlink, and/or the HARQ-ACK. The CSI, as well as the HARQ-ACK, is Uplink Control Information (UCI). The terminal apparatus 1 may transmit the PUSCH, based on detection of a Physical Downlink Control Channel (PDCCH) including uplink grant.
The CSI includes at least a Channel Quality Indicator (CQI), a Rank Indicator (RI), and a Precoding Matrix Indicator (PMI). The CQI expresses a combination of a modulation scheme and a coding rate for a single transport block to be transmitted on the PDSCH. The RI indicates the number of active layers determined by the terminal apparatus 1. The PMI indicates a codebook determined by the terminal apparatus 1. The codebook is associated with precoding of the PDSCH.
The RI is also referred to as type A CSI. The type A CSI may include CSI other than the RI. The CQI and the PMI are also referred to as type B CSI. The type B CSI may include CSI other than the CQI and the PMI.
The HARQ-ACK corresponds to downlink data (Transport block, Medium Access Control Protocol Data Unit (MAC PDU), Downlink-Shared Channel (DL-SCH), Physical Downlink Shared Channel (PDSCH)). The HARQ-ACK indicates an acknowledgement (ACK) or a negative-acknowledgement (NACK). The HARQ-ACK is also referred to as ACK/NACK, HARQ feedback, HARQ acknowledge, HARQ information, or HARQ control information.

The PRACH is used to transmit a random access preamble.

The following uplink physical signals are used in the uplink radio communication. The uplink physical signals are not used for transmitting information output from the higher layer, but are used by the physical layer.

Demodulation Reference Signal (DMRS)
Phrase Tracking Reference Signal (PTRS)

The DMRS is associated with PUCCH or PUSCH transmission. The DMRS may be time-multiplexed with the PUSCH. The base station apparatus 3 may use the DMRS in order to perform channel compensation of the PUSCH.

The PTRS is associated with PUSCH transmission. The PTRS may be mapped to every A symbols. Time density A of the PTRS may be determined at least based on a part or all of the following (1) to (9). The PTRS may be mapped to every B symbols. Frequency density B of the PTRS may be determined at least based on a part or all of the following (1) to (9). In other words, the number $N_{PTRS}$ of resource elements for the PTRS for PUSCH transmission in the current slot for the transport block may be determined at least based on a part or all of the following (1) to (9). (1) A target coding rate R; (2) a modulation order $Q_m$; (3) a bandwidth $M_{SC}$ scheduled for PUSCH transmission in the current slot for the transport block, expressed as the number of subcarriers; (4) a bandwidth $M_{SC\_initial}$ scheduled for PUSCH initial transmission for the same transport block, expressed as the number of subcarriers; (5) the number $N_{symb}$ of SC-FDMA symbols or OFDM symbols for PUSCH transmission in the current slot for the transport block; (6) the number $N_{symb\_initial}$ of SC-FDMA symbols or OFDM symbols for PUSCH initial transmission for the same transport block; (7) the number NRE of resource elements allocated for the PUSCH; (8) the virtual number $N^{virtual}_{RE}$ of resource elements allocated for the PUSCH; and (9) higher layer parameter UL-CyclicPrefixLength indicating a Cyclic Prefix (CP) length.

The time density A of the PTRS for PUSCH retransmission in the current slot for the transport block may be given based on the time density A of the PTRS for PUSCH initial transmission for the same transport block. The frequency density B of the PTRS for PUSCH retransmission in the current slot for the transport block may be given based on the frequency density B of the PTRS for PUSCH initial transmission for the same transport block.

$M_{SC}$ may be a value different from a value of $M_{SC\_initial}$. $N_{symb}$ may be a value different from a value of $N_{symb\_initial}$.

The terminal apparatus 1 may acquire R, $Q_m$, $M_{SC}$, $M_{SC\_initial}$, $N_{symb}$, $N_{symb\_initial}$, $N_{RE}$, and/or $N^{virtual}_{RE}$, based on the uplink grant. The base station apparatus 3 may notify the terminal apparatus 1 of R, $Q_m$, $M_{SC}$, $M_{SC\_initial}$, $N_{symb}$, $N_{symb\_initial}$, $N_{RE}$, and/or $N^{virtual}_{RE}$, by using the uplink grant.

The following downlink physical channels are used for downlink radio communication from the base station apparatus 3 to the terminal apparatus 1. The downlink physical channels are used for transmitting information output from the higher layer.

Physical Downlink Control Channel (PDCCH)
Physical Downlink Control Channel (PDSCH)

The PDCCH is used to transmit Downlink Control Information (DCI). The downlink control information is also referred to as DCI format. The downlink control information includes an uplink grant. The uplink grant may be used for scheduling of a single PUSCH within a single cell. The uplink grant may be used for scheduling multiple PUSCHs in multiple slots within a single cell. The uplink grant may be used for scheduling a single PUSCH in multiple slots within a single cell.

The PDSCH is used to transmit downlink data (Transport block, Downlink-Shared Channel (DL-SCH)).

The UL-SCH and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU).

A configuration of the radio frame according to the present embodiment will be described below.

Figure 4:
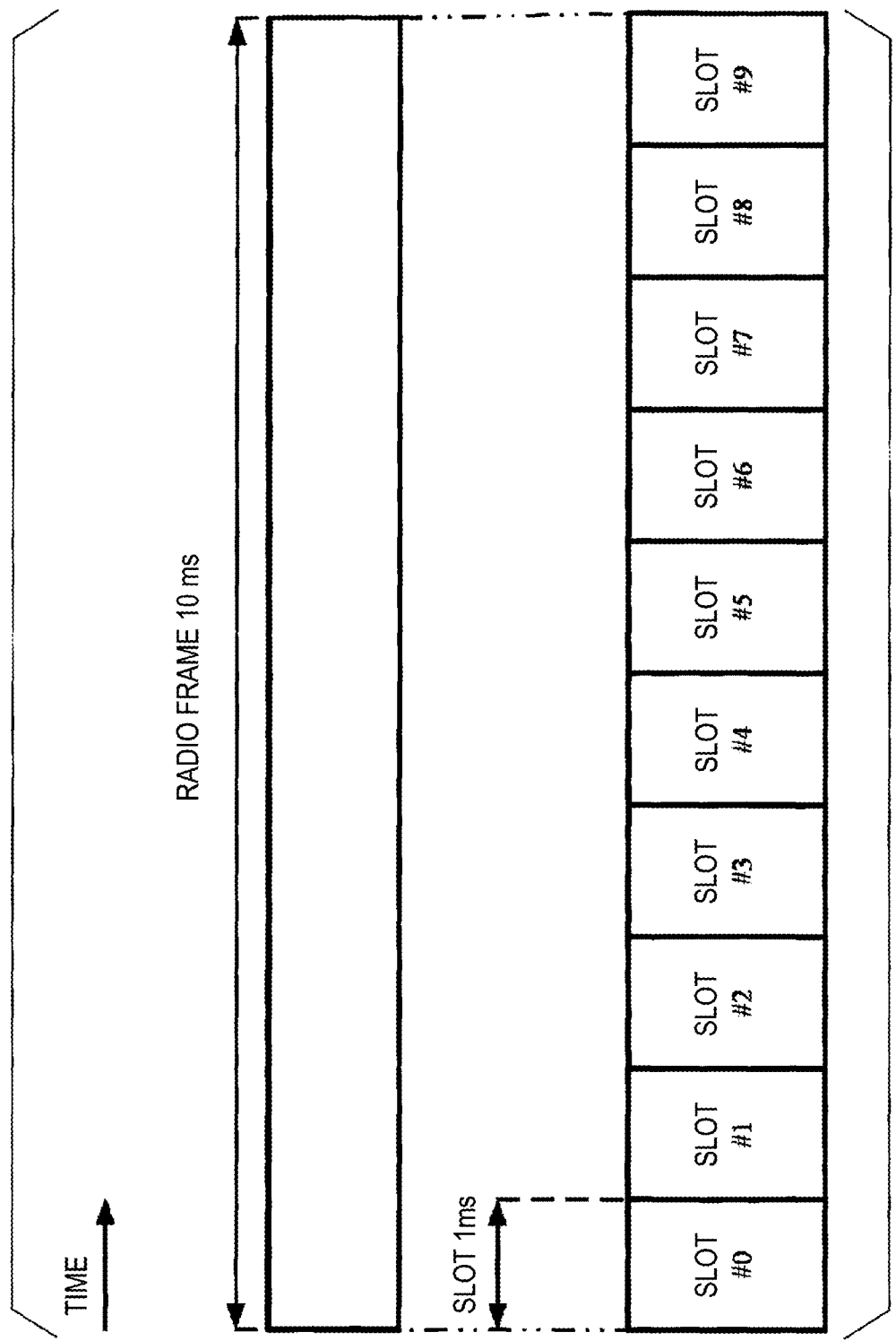
FIG. 4 is a diagram illustrating a schematic configuration of a radio frame according to the present embodiment.

FIG. 4 is a diagram illustrating a schematic configuration of a radio frame according to the present embodiment. In FIG. 4, the horizontal axis is a time axis. Each of the radio frames may be 10 ms in length. Furthermore, each of the radio frames may include ten slots. Each of the slots may be 1 ms in length.

Figure 5:
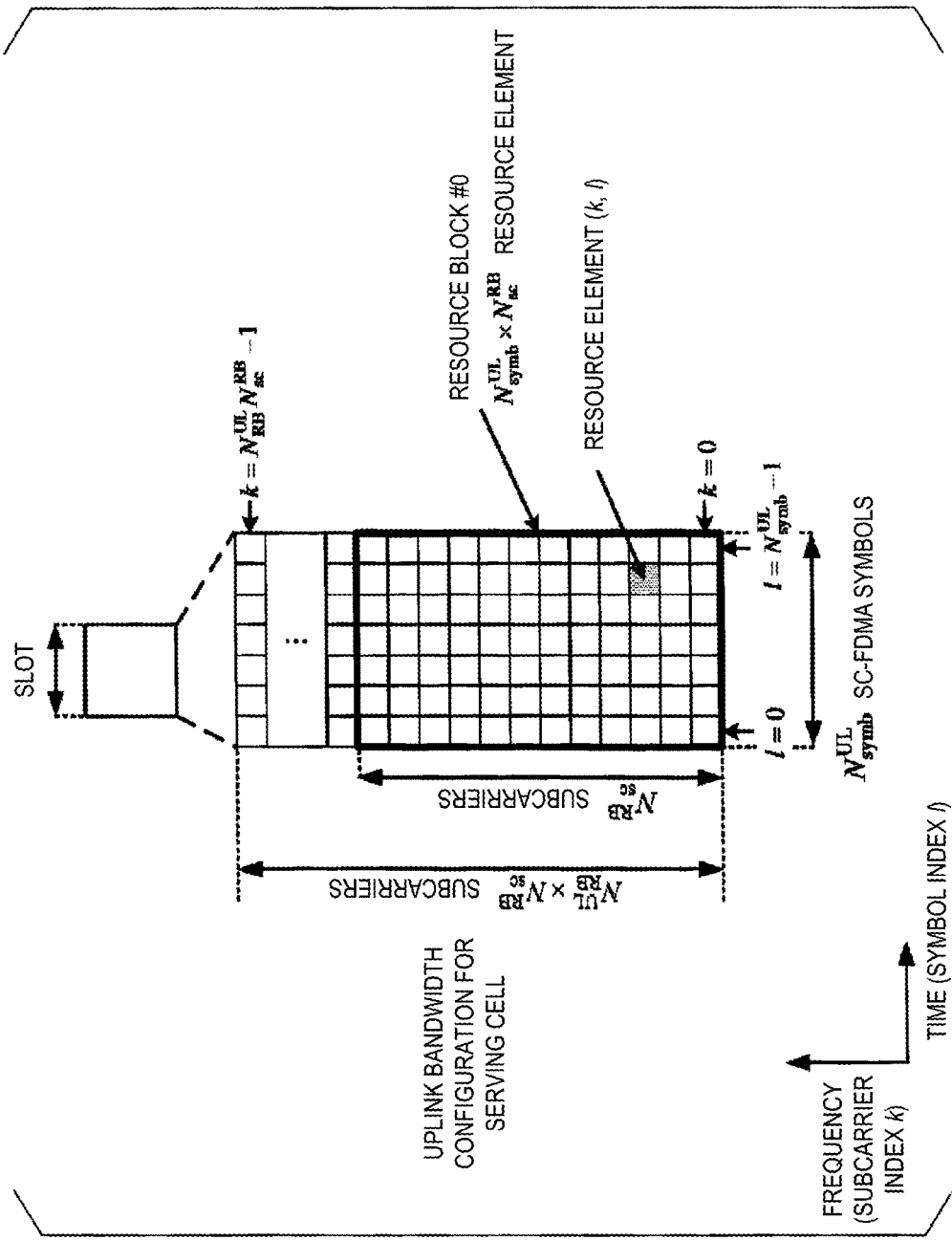
FIG. 5 is a diagram illustrating a schematic configuration of an uplink slot according to the present embodiment.

An example configuration of a slot according to the present embodiment will be described below. FIG. 5 is a diagram illustrating a schematic configuration of an uplink slot according to the present embodiment. In FIG. 5, a configuration of an uplink slot in a cell is illustrated. In FIG. 5, the horizontal axis represents a time axis, and the vertical axis represents a frequency axis. The uplink slot may include $N^{UL}_{symb}$ SC-FDMA symbols. The uplink slot may include $N^{UL}_{symb}$ OFDM symbols. In the following, the present embodiment will give description using a case that the uplink slot includes an OFDM symbol, but the present embodiment is also applicable to a case that the uplink slot includes an SC-FDMA symbol.

In FIG. 5, l is an OFDM symbol number/index, and k is a subcarrier number/index. The physical signal or the physical channel transmitted in each of the slots is expressed by a resource grid. In uplink, the resource grid is defined by multiple subcarriers and multiple OFDM symbols. Each element within the resource grid is referred to as a resource element. The resource element is expressed by a subcarrier number/index k and an OFDM symbol number/index l.

The uplink slot includes multiple OFDM symbols l (l=0, 1, ..., $N^{UL}_{symb}$) in the time domain. For a normal Cyclic Prefix (CP) in the uplink, $N^{UL}_{symb}$ may be 7 or 14. For an extended CP in the uplink, $N^{UL}_{symb}$ may be 6 or 12.

The terminal apparatus 1 receives the higher layer parameter UL-CyclicPrefixLength indicating the CP length in the uplink from the base station apparatus 3. The base station apparatus 3 may broadcast, in the cell, system information including the higher layer parameter UL-CyclicPrefixLength corresponding to the cell.

The uplink slot includes multiple subcarriers k (k=0, 1, ..., $N^{UL}_{RB} \cdot N^{RB}_{SC}$) in the frequency domain. $N^{UL}_{RB}$ is an uplink bandwidth configuration for the serving cell expressed by a multiple of $N^{RB}_{SC}$. $N^{RB}_{SC}$ is the (physical) resource block size in the frequency domain expressed by the number of subcarriers. The subcarrier spacing Δf may be 15 kHz. The NRBsc may be 12. The (physical) resource block size in the frequency domain may be 180 kHz.

One physical resource block is defined by $N^{uL}_{symb}$ consecutive OFDM symbols in the time domain and by $N^{RB}_{SC}$ consecutive subcarriers in the frequency domain. Hence, one physical resource block is constituted by ($N^{UL}_{symb} \cdot N^{RB}_{SC}$) resource elements. One physical resource block may correspond to one slot in the time domain. The physical resource blocks may be numbered $n_{PRB}$ (0, 1, . . . , $N^{UL}_{RB}-1$) in ascending order of frequencies in the frequency domain.

The downlink slot according to the present embodiment includes multiple OFDM symbols. Since the configuration of the downlink slot according to the present embodiment is basically the same as the configuration of the uplink slot, the description of the configuration of the downlink slot will be omitted.

Configurations of apparatuses according to the present embodiment will be described below.

Figure 6:
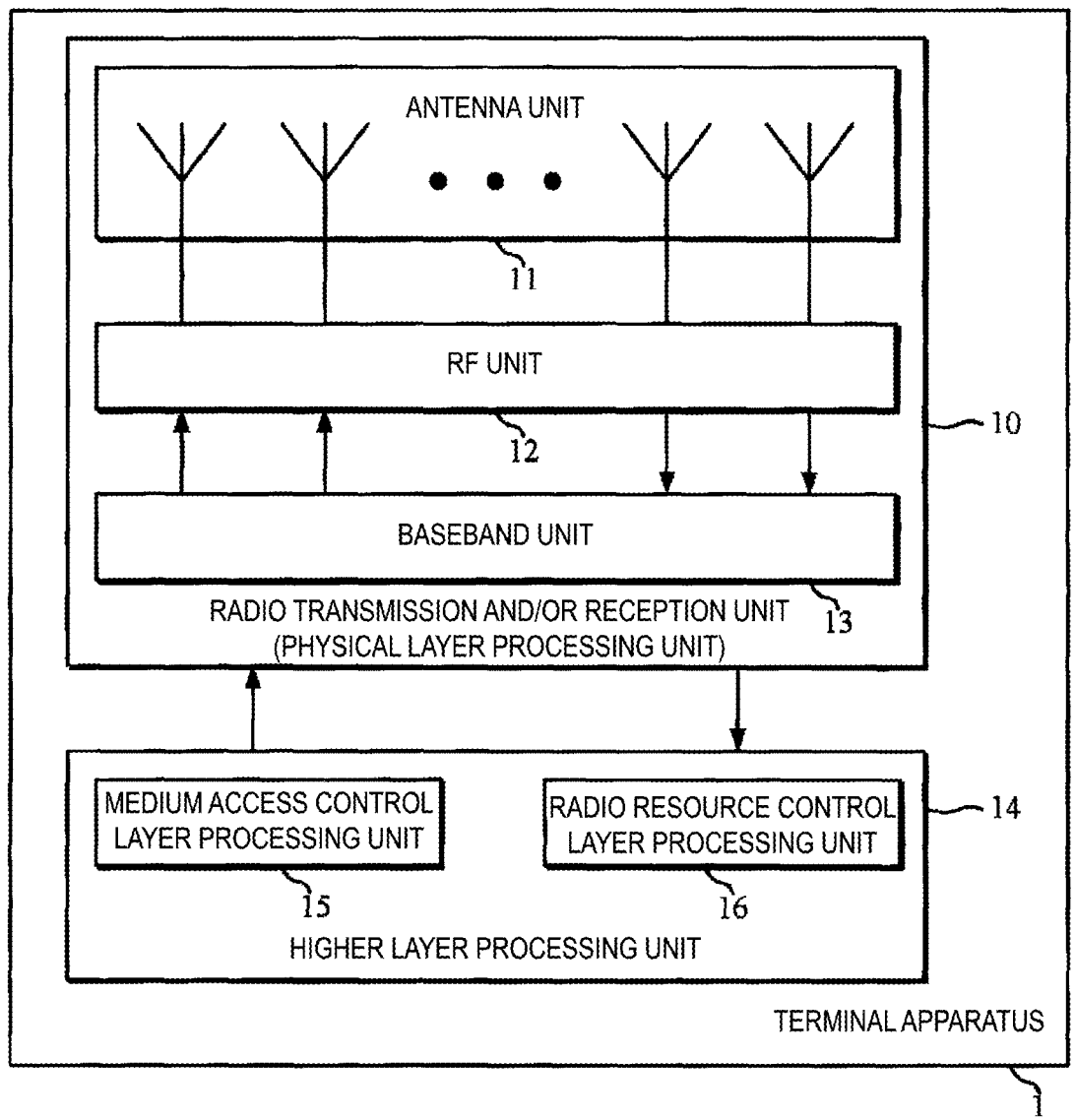
FIG. 6 is a schematic block diagram illustrating a configuration of a terminal apparatus 1 according to the present embodiment.

FIG. 6 is a schematic block diagram illustrating a configuration of the terminal apparatus 1 according to the present embodiment. As illustrated, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver, a coding unit, a decoding unit, or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the medium access control layer. The medium access control layer processing unit 15 controls random access procedure, based on various types of configuration information/parameters managed by the radio resource control layer processing unit 16.

The radio resource control layer processing unit 16 included in the higher layer processing unit 14 performs processing of the radio resource control layer. The radio resource control layer processing unit 16 manages various types of configuration information/parameters of the terminal apparatus 1. The radio resource control layer processing unit 16 sets various types of configuration information/parameters based on higher layer signaling received from the base station apparatus 3. Namely, the radio resource control layer processing unit 16 sets the various types of configuration information/parameters, based on the information for indicating the various types of configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 7:
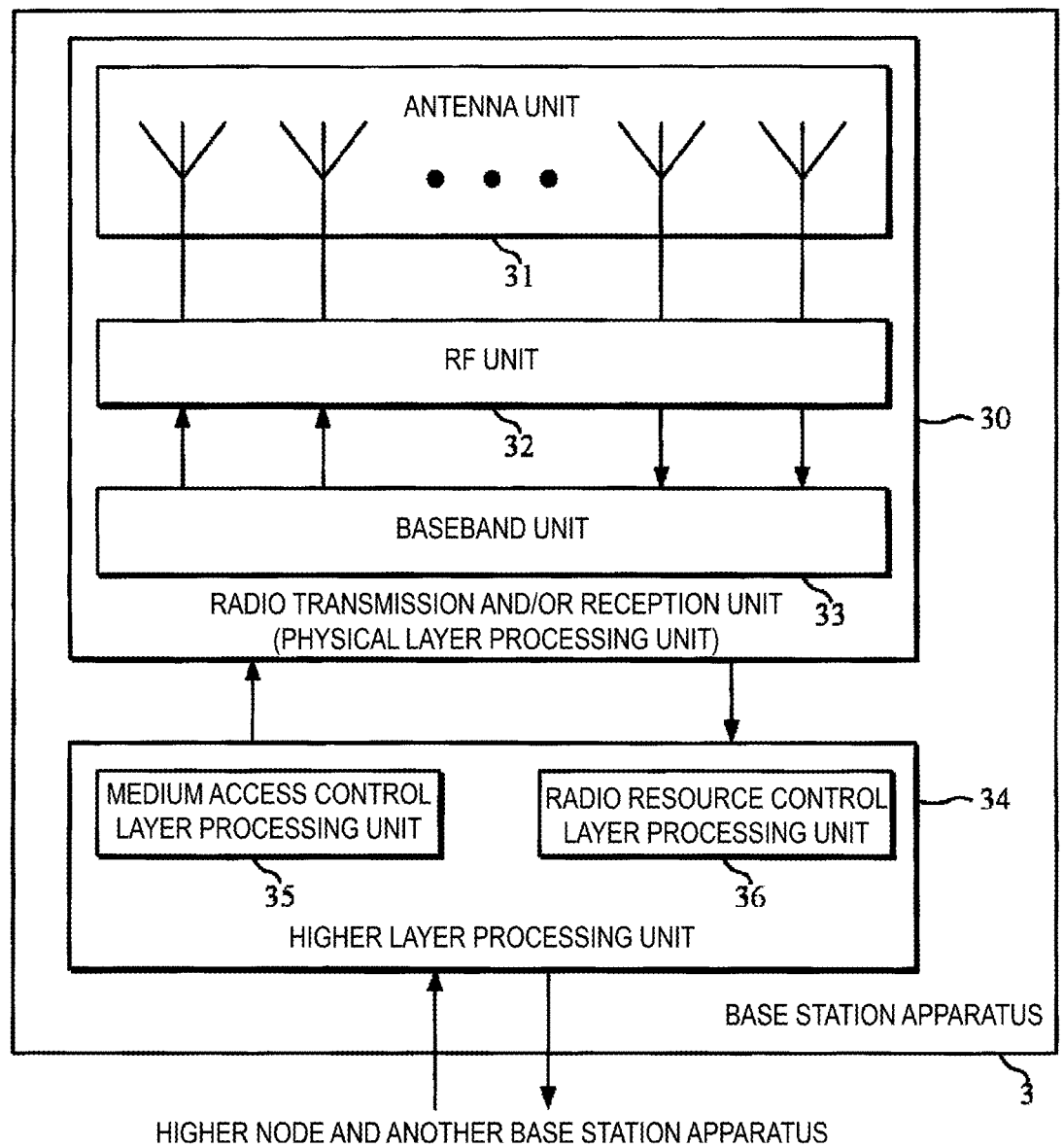
FIG. 7 is a schematic block diagram illustrating a configuration of a base station apparatus 3 according to the present embodiment.

FIG. 7 is a schematic block diagram illustrating a configuration of the base station apparatus 3 according to the present embodiment. As illustrated, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver, a coding unit, a decoding unit, or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the medium access control layer. The medium access control layer processing unit 35 controls random access procedure, based on various types of configuration information/parameters managed by the radio resource control layer processing unit 36.

The radio resource control layer processing unit 36 included in the higher layer processing unit 34 performs processing of the radio resource control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information for indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit. Each of the units having the reference signs 10 to 16 included in the terminal apparatus 1 may be configured as at least one processor and a memory coupled to the at least one processor. Each of the units having the reference signs 30 to 36 included in the base station apparatus 3 may be configured as at least one processor and a memory coupled to the at least one processor.

Coding processing for the transport block, the type A CSI, the type B CSI, and the HARQ-ACK transmitted by using the PUSCH will be described below.

Figure 8:
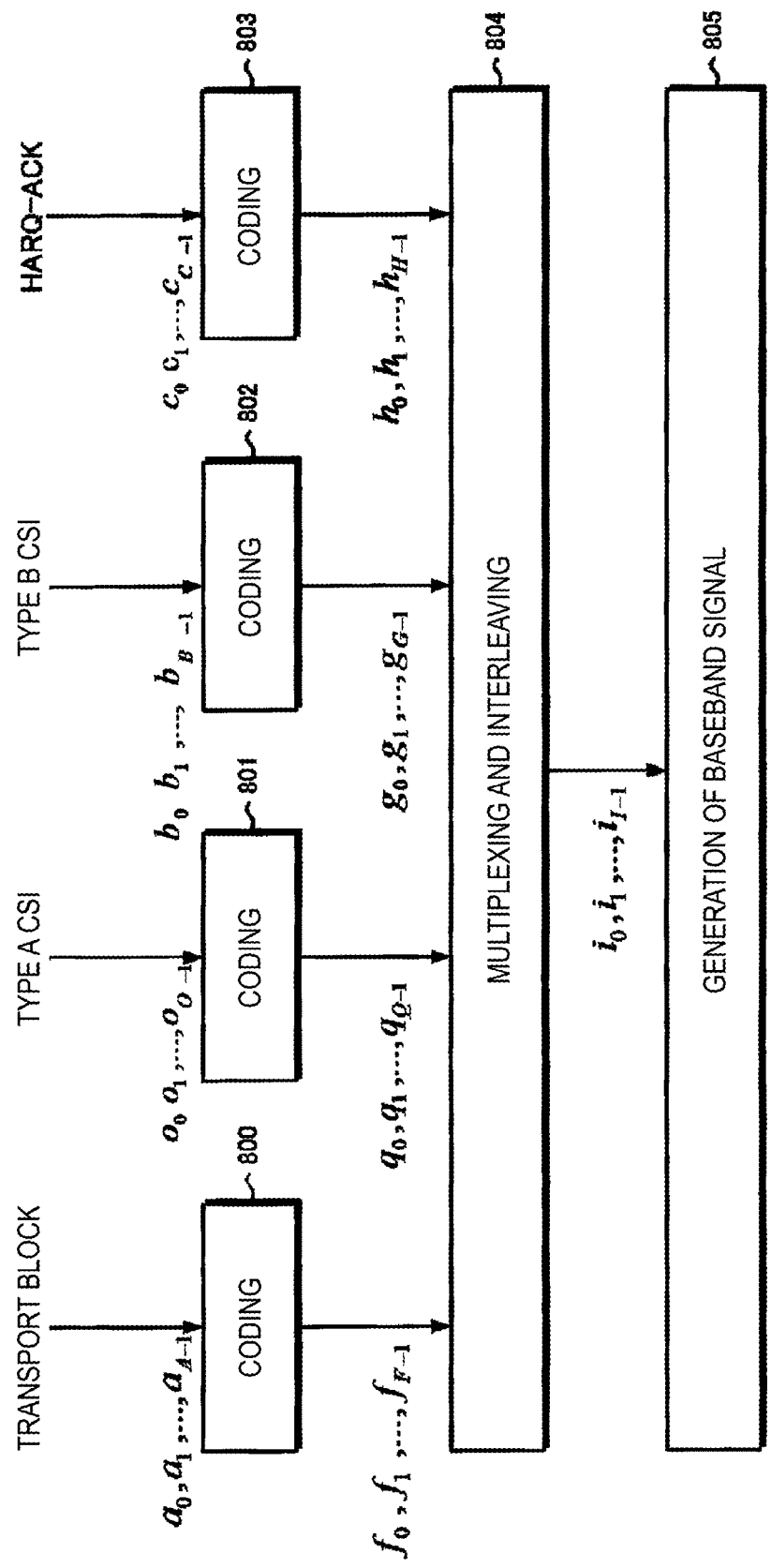
FIG. 8 is a diagram illustrating an example of coding processing for a transport block ($a_k$), type A CSI ($o_k$), type B CSI ($b_k$), and a HARQ-ACK ($c_k$) according to the present embodiment.

FIG. 8 is a diagram illustrating an example of coding processing for a transport block ($a_k$), type A CSI ($o_k$), type B CSI ($b_k$), and a HARQ-ACK ($c_k$) according to the present embodiment. In 800 to 803 of FIG. 8, the transport block ($a_k$), the type A CSI ($o_k$), the type B CSI ($b_k$), and the HARQ-ACK ($c_k$) are separately coded. In 804 of FIG. 8, coded bits ($f_k$) of the transport block, coded bits ($q_k$) of the type A CSI, coded bits ($g_k$) of the type B CSI, and coded bits ($h_k$) of the HARQ-ACK are multiplexed and interleaved. In 805 of FIG. 8, a baseband signal (a PUSCH signal) is generated from the coded bits multiplexed and interleaved in 804.

Figure 9:
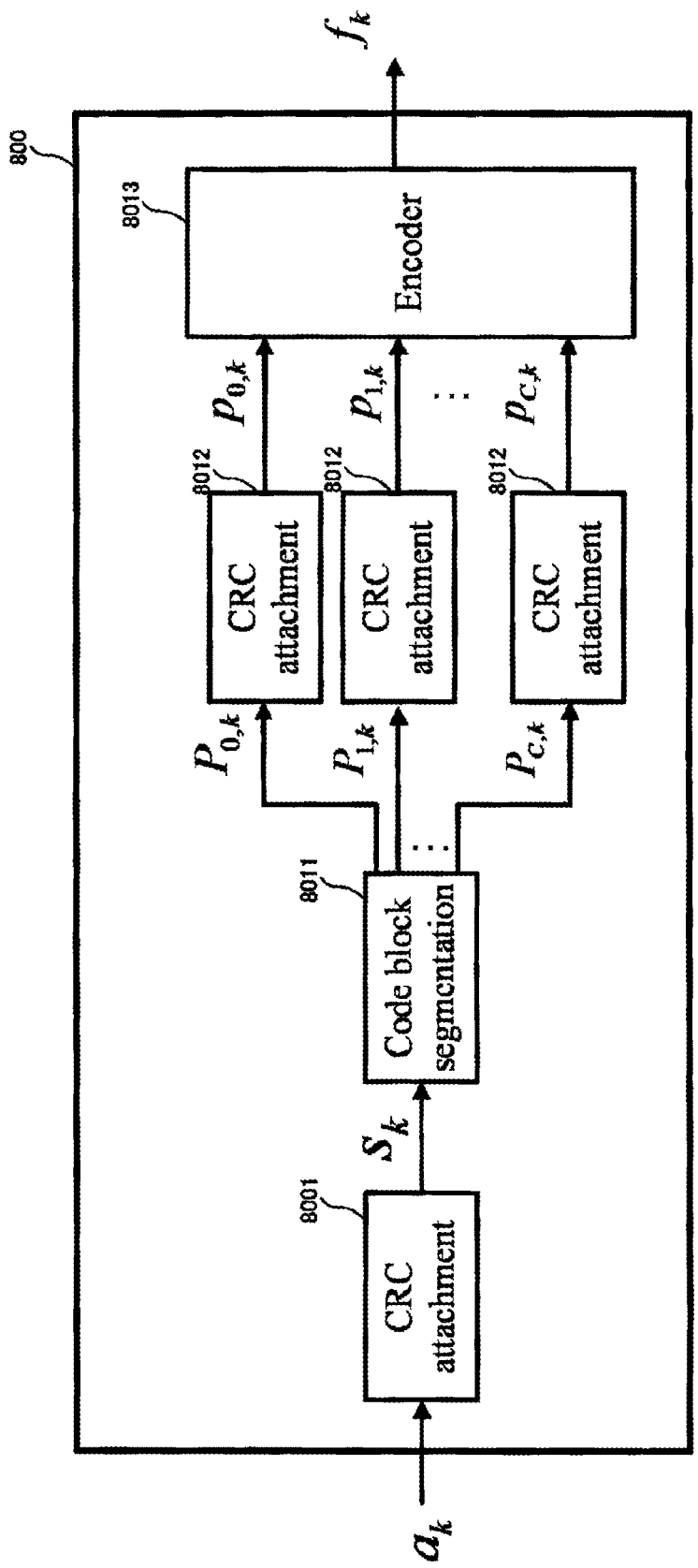
FIG. 9 is a diagram illustrating an example of coding of the transport block in 800 of the present embodiment.

FIG. 9 is a diagram illustrating an example of coding of the transport block in 800 of the present embodiment. In 8001, CRC parity bits are added to the transport block $a_k$. With this, a sequence $s_k$ of the transport block to which the CRC parity bits are added is generated. The CRC parity bits in 8001 are generated based on the transport block $a_k$.

In 8011, the sequence $s_k$ of the transport block to which the CRC parity bits are added may be segmented into multiple code blocks $P_{i,k}$. In 8011, the sequence $s_k$ of the transport block to which the CRC parity bits are added may be mapped to one code block $P_{0,k}$. Here, the number C of code blocks corresponding to the sequence $s_k$ may be given at least based on the size of the transport block $a_k$.

Figure 10:
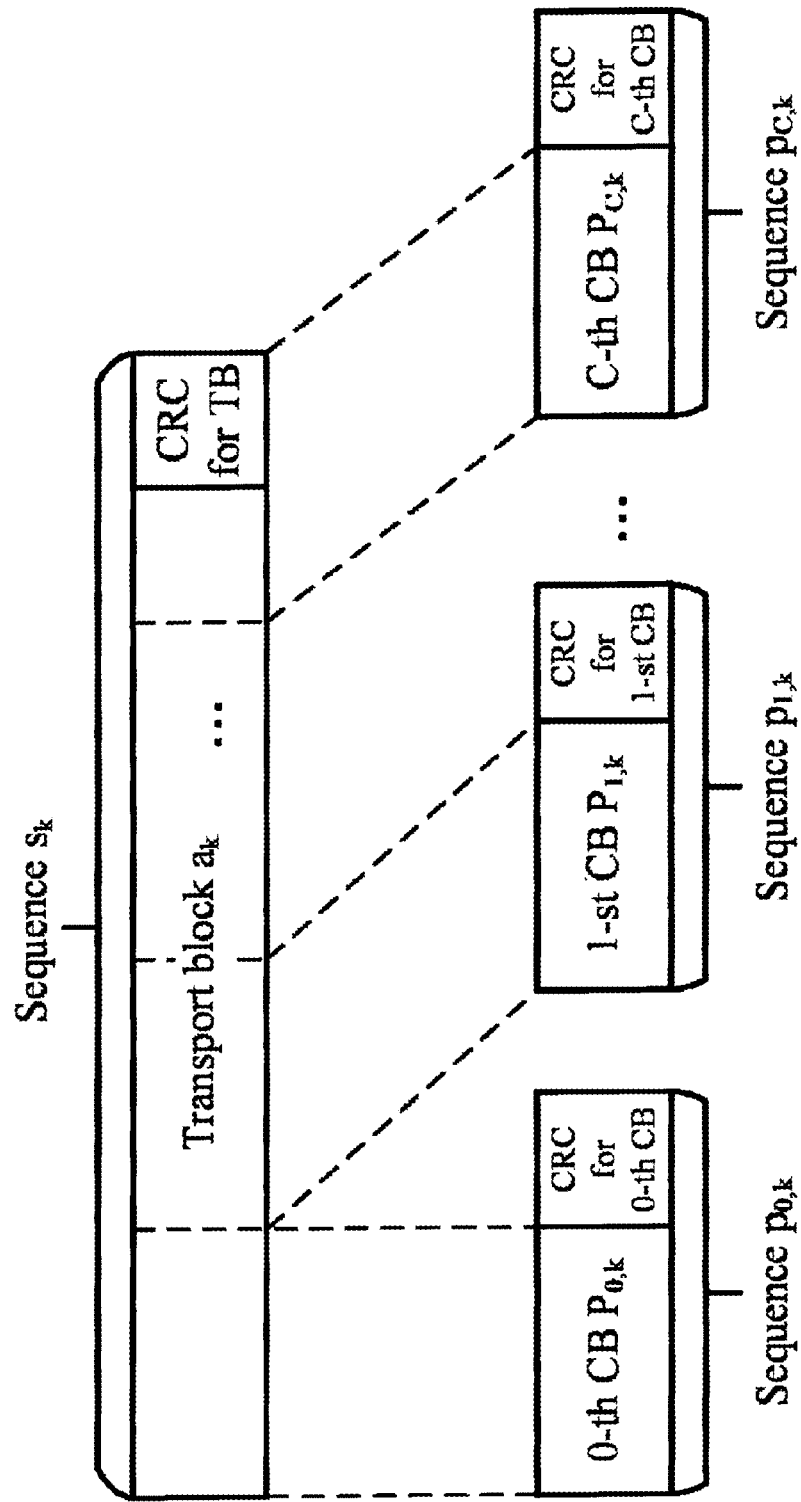
FIG. 10 is a diagram illustrating an outline of sequences $p_{i,k}$ of code blocks to which CRC parity bits are added according to the present embodiment.

In each 8012, CRC parity bits are added to each code block $P_{i,k}$. With this, a sequence $p_{i,k}$ of each code block to which the CRC parity bits are added is generated. The CRC parity bits in 8012 are generated based on the code block $P_{i,k}$. FIG. 10 is a diagram illustrating an outline of the sequences $p_{i,k}$ of the code blocks to which the CRC parity bits are added according to the present embodiment. Each code block may include CRC parity bits for the transport block. The size of each sequence $p_{i,k}$ is $K_r$. In other words, $K_r$ is an r-th code block size including CRC parity bits.

In 8013, the terminal apparatus 1 performs channel coding (for example, turbo coding and LDPC coding) on each sequence $p_{i,k}$. In 8013, the terminal apparatus 1 collects, selects, and/or removes multiple channel-coded sequences, and thereby generates a sequence $f_k$ of the coded bits of the transport block.

Figure 11:
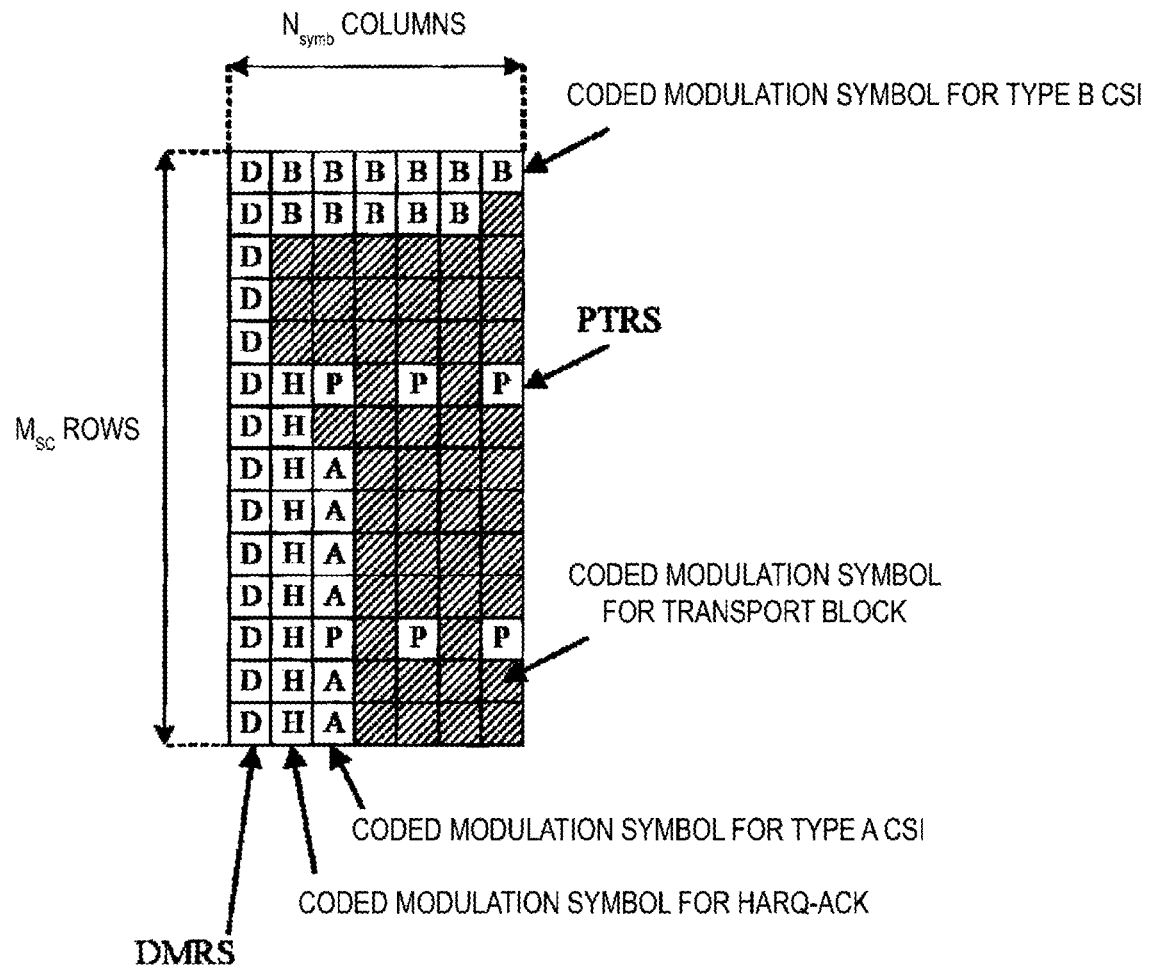
FIG. 11 is a diagram illustrating an example of multiplexing and interleaving of coded bits according to the present embodiment.

FIG. 11 is a diagram illustrating an example of multiplexing and interleaving of the coded bits according to the present embodiment. A matrix may be used for multiplexing and interleaving of the coded bits. The columns of the matrix may correspond to OFDM symbols or SC-FDMA symbols. The quadrangles of FIG. 11 are elements of the matrix. One element of the matrix may correspond to one coded modulation symbol. The coded modulation symbol is a group of $Q_m$ coded bits. $Q_m$ represents a modulation order for the PUSCH (transport block). One complex-value symbol is generated from one coded modulation symbol. The quadrangle denoted by D is an element to which the DMRS is mapped. The quadrangle denoted by P is an element to which the PTRS is mapped. The quadrangle denoted by H is an element to which the coded modulation symbol for the HARQ-ACK is mapped. The quadrangle denoted by A is an element to which the coded modulation symbol for the type A CSI is mapped. The quadrangle denoted by B is an element to which the coded modulation symbol for the type B CSI is mapped. The hatched quadrangle is an element to which the coded modulation symbol for the transport block is mapped.

In a case of OFDM, the terminal apparatus 1 may map multiple complex-value symbols, which are generated from multiple coded modulation symbols mapped to one column, to multiple resource elements in one OFDM symbol allocated for the PUSCH. In other words, in the case of OFDM, the coded modulation symbols of FIG. 11 may be replaced with modulation symbols. In the case of OFDM, one row corresponds to one subcarrier, and one element corresponds to one resource element. In a case of SC-FDMA, the terminal apparatus 1 may map multiple complex-value symbols, which are obtained by performing DFT precoding on multiple complex-value symbols generated from multiple coded modulation symbols mapped to one column, to multiple resource elements in one SC-FDMA symbol allocated for the PUSCH.

The coded modulation symbol for the transport block may be mapped to an element except the element to which the DMRS is mapped, the element to which the PTRS is mapped, the element to which the type A CSI is mapped, and the element to which the type B CSI is mapped.

The coded modulation symbol for the transport block may be mapped to the element to which the coded modulation symbol for the HARQ-ACK is mapped. In this case, the coded modulation symbol for the HARQ-ACK may overwrite a part of the coded modulation symbol for the transport block. In this case, the coded modulation symbol for the HARQ-ACK may overwrite the element to which the coded modulation symbol for the transport block is mapped. The coded modulation symbol for the transport block may be mapped to an element except the element to which the coded modulation symbol for the HARQ-ACK is mapped. In other words, in mapping of the coded modulation symbol for the transport block, the element to which the coded modulation symbol for the HARQ-ACK is mapped may be skipped.

Whether the coded modulation symbol for the transport block is mapped to the element to which the coded modulation symbol for the HARQ-ACK is mapped, or to an element except the element to which the coded modulation symbol for the HARQ-ACK is mapped may be given at least based on a part or all of the number of HARQ-ACK bits, the number $Q'_{ACK}$ of coded modulation symbols for the HARQ-ACK, the number $Q_{ACK}$ of coded bits for the HARQ-ACK, a transport block size TBS, a target coding rate R, the modulation order $Q_m$, and/or a value of a field of the uplink grant. The target coding rate R may be greater than 0 and less than 1.

Figure 12:
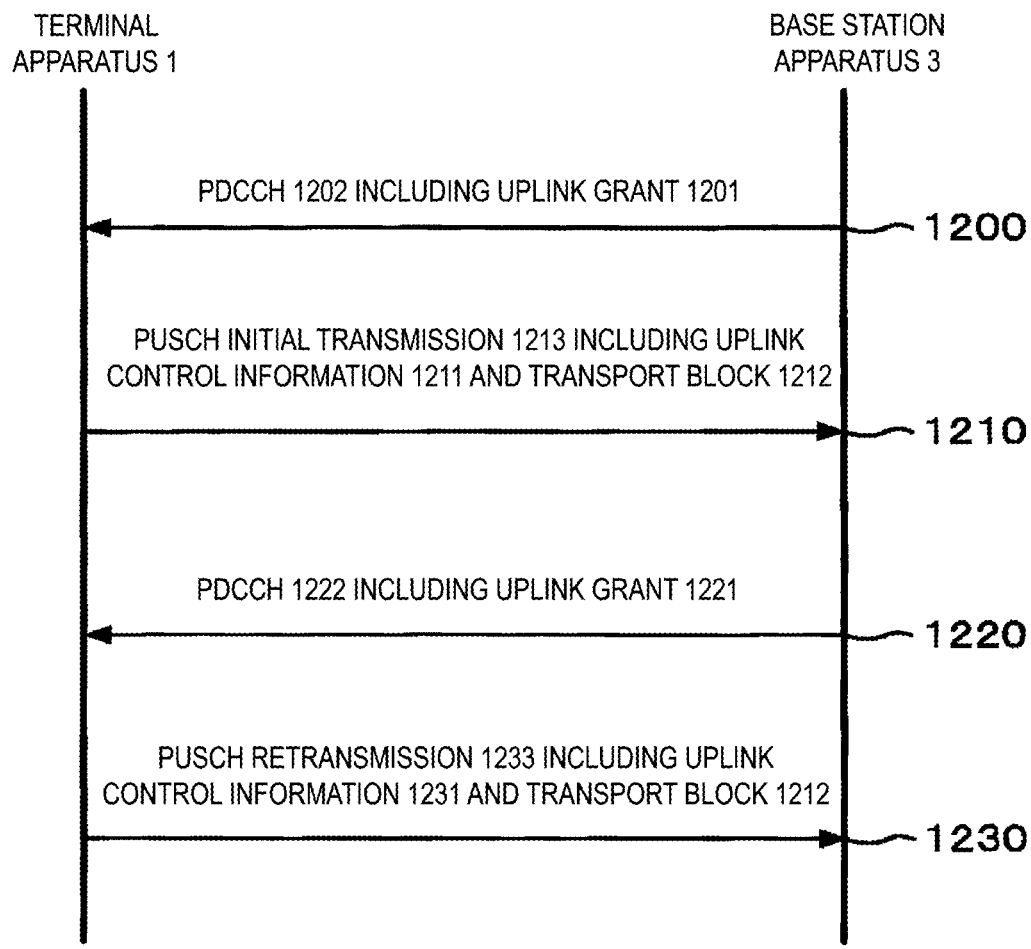
FIG. 12 is a diagram illustrating an example of a sequence chart related to PUSCH transmission according to the present embodiment.

FIG. 12 is a diagram illustrating an example of a sequence chart related to PUSCH transmission according to the present embodiment. In 1200, the base station apparatus 3 transmits, to the terminal apparatus 1, a PDCCH 1202 including an uplink grant 1201 indicating initial transmission. In 1210, based on detection of the PDCCH 1202, the terminal apparatus 1 performs PUSCH initial transmission 1213 including uplink control information 1211 (a HARQ-ACK, type A CSI, and/or type B CSI) and a transport block 1212. In a case that the base station apparatus 3 fails to successfully decode the transport block 1212, the base station apparatus 3 transmits, to the terminal apparatus 1, a PDCCH 1222 including an uplink grant 1221 that indicates retransmission in 1220. The terminal apparatus 1 performs PUSCH retransmission 1233 including uplink control information 1231 (a HARQ-ACK, type A CSI, and/or type B CSI) and a transport block 1212.

Parameters (v, C, C', K, K'$_r$, $M_{SC\_initial}$, $N_{PTRS\_initial}$, $N_{symb\_initial}$, $Q_m$, and R) used for calculation of $Q'_{ACK}$, $Q'_{CSI\_A}$, and/or $Q'_{CSI\_B}$ for the uplink control information 1211 may be given based on the uplink grant 1201. Parameters (v, C, C', K, K'$_r$, $M_{SC\_initial}$, $N_{PTRS\_initial}$, $N_{symb\_initial}$, $Q_m$, and R) used for calculation of $Q'_{ACK}$, $Q'_{CSI\_A}$, and/or $Q'_{CSI\_B}$ for the uplink control information 1231 may be given based on the uplink grant 1201.

Parameters ($M_{SC}$, $N_{PTRS}$, and $N_{symb}$) for the PUSCH initial transmission 1213 are the same as the parameters ($M_{SC\_initial}$, $N_{PTRS\_initial}$, and $N_{symb\_initial}$). The parameters ($M_{SC}$, $N_{PTRS}$, and $N_{symb}$) for the PUSCH retransmission 1233 may be defined separately from the parameters ($M_{SC\_initial}$, $N_{PTRS\_initial}$, and $N_{symb\_initial}$), and may be given based on the uplink grant 1221.

A method of determining the transport block size will be described below.

The terminal apparatus 1 and the base station apparatus 3 may determine the transport block size TBS, out of a set of transport block size candidates. The number of bits of the transport block size candidate at least satisfies a condition of being a multiple of 8. The number of bits of the transport block size candidate may satisfy another condition.

As the transport block size TBS, the terminal apparatus 1 and the base station apparatus 3 may select a transport block size candidate that is larger than a temporary transport block size $TBS_{temp}$ and that has the smallest value. As the transport block size TBS, the terminal apparatus 1 and the base station apparatus 3 may select a transport block size candidate that is smaller than the temporary transport block size $TBS_{temp}$ and that has the largest value.

The temporary transport block size $TBS_{temp}$ may be given according to Equation (1). The temporary transport block size $TBS_{temp}$ may be given at least based on the modulation order $Q_m$, the target coding rate R, the number $N_{RE}$ of allocated resource elements, and the number v of layers. In other words, the transport block size may be given at least based on the modulation order $Q_m$, the target coding rate R, the number $N_{RE}$ of allocated resource elements, and the number v of layers. The number of layers may be the number of layers which are spatially multiplexed. The present embodiment will give detailed description of a case that the number v of layers is 1, but the present embodiment may be applied to a case that the number v of layers is greater than 1. The present embodiment will give detailed description of a case that one transport block is transmitted on the PUSCH, but the present embodiment may be applied to a case that multiple transport blocks are transmitted on the PUSCH.

$$TBS_{temp} = Q_m \cdot R \cdot N_{RE} \cdot v \qquad \text{Equation 1}$$

wherein
 $Q_m$ is the modulation order
 R is the target code rate
 $N_{RE}$ is the number of the allocated REs
 v is the number of layers The modulation order $Q_m$ may be indicated by a first field included in the uplink grant. The target coding rate R may be indicated by a second field included in the uplink grant. The number v of layers for PUSCH transmission may be indicated by a third field included in the uplink grant. The first field may be the same as or different from the second field. The first field may be the same as or different from the third field. The second field may be the same as or different from the third field.

In a case that the coded modulation symbol for the transport block is mapped to an element except the element to which the coded modulation symbol for the HARQ-ACK is mapped, the number $N_{RE}$ of allocated resource elements may be given according to Equation (2). In a case that the coded modulation symbol for the transport block is mapped to the element to which the coded modulation symbol for the HARQ-ACK is mapped, the number $N_{RE}$ of allocated resource elements may be given according to Equation (3).

$$N_{RE} = M_{SC\_initial} \cdot N_{symb\_initial} - (Q'_{ACK} + Q'_{CSI\_A} + Q'_{CSI\_B}) - N_{PTRS\_initial} \qquad \text{Equation 2}$$

wherein
 $M_{SC\_initial}$ is the scheduled bandwidth for initial PUSCH transmission for the same transport block, expressed as the number of subcarriers
 $N_{symb\_initial}$ is the number of SC-FDMA symbols or OFDM symbols for initial PUSCH transmission for the same transport block
 $Q'_{ACK}$ is the number of coded modulation symbols for HARQ-ACK
 $Q'_{CSI\_A}$ is the number of coded modulation symbols for type A CSI
 $Q'_{CSI\_B}$ is the number of coded modulation symbols for type B CSI
 $N_{PTRS\_initial}$ is the number of REs for the Phase Tracking Reference Signal for initial PUSCH transmission for the same transport block $$N_{RE} = M_{SC} \cdot N_{symb} - (Q'_{CSI\_A} + Q'_{CSI\_B}) - N_{PTRS\_initial} \qquad \text{Equation 3}$$

The number $Q'_{ACK}$ of coded modulation symbols for the HARQ-ACK is the same as the number of resource elements for the HARQ-ACK, and the number of modulation symbols/complex-value symbols for the HARQ-ACK. The number $Q'_{CSI\_A}$ of coded modulation symbols for the type A CSI is the same as the number of resource elements for the type A CSI, and the number of modulation symbols/complex-value symbols for the type A CSI. The number $Q'_{CSI\_B}$ of coded modulation symbols for the type B CSI is the same as the number of resource elements for the type B CSI, and the number of modulation symbols/complex-value symbols for the type B CSI. The number Q' of coded modulation symbols for the CSI may be the sum of the number $Q'_{CSI\_A}$ of coded modulation symbols for the type A CSI and the number $Q'_{CSI\_B}$ of coded modulation symbols for the type B CSI.

The number $Q_{ACK}$ of coded bits of the HARQ-ACK is obtained by multiplying the number $Q'_{ACK}$ of coded modulation symbols for the HARQ-ACK and the modulation order $Q_m$. The number $Q_{CSI\_A}$ of coded bits of the type A CSI is obtained by multiplying the number $Q'_{CSI\_A}$ of coded modulation symbols for the type A CSI and the modulation order $Q_m$. The number $Q_{CSI\_B}$ of coded bits of the type B CSI is obtained by multiplying the number $Q'_{CSI\_B}$ of coded modulation symbols for the type B CSI and the modulation order $Q_m$.

The number $Q'_{ACK}$ of coded modulation symbols for the HARQ-ACK may be given according to Equation (4). The number $Q'_{CSI\_A}$ of coded modulation symbols for the type A CSI may be given according to Equation (4). The number $Q'_{CSI\_A}$ of coded modulation symbols for the type B CSI may be given according to Equation (4). In other words, for the HARQ-ACK, the number Q' of coded modulation symbols in Equation (4) may be replaced with $Q'_{ACK}$. For the type A CSI, the number Q' of coded modulation symbols in Equation (4) may be replaced with $Q'_{CSI\_A}$. For the type B CSI, the number Q' of coded modulation symbols in Equation (4) may be replaced with $Q'_{CSI\_B}$.

$$Q' = \min\left\{ \text{ceil}\left( \frac{(O+L) \cdot \begin{pmatrix} M_{SC\_initial} \cdot \\ N_{symb\_initial} - \\ N_{PTRS\_initial} \end{pmatrix} \cdot \beta}{\sum_{r=0}^{C'-1} K'_r} \right), M_{max} \right\} \quad \text{Equation 4}$$

wherein

O is the number of HARQ-ACK bits or type A CSI bits or type B CSI bits

L is the number of CRC parity bits for

HARQ-ACK or type A CSI bits or type B CSI

For HARQ-ACK, $\beta = \beta^{HARQ\text{-}ACK}$.

For type A CSI, $\beta = \beta^{CSI\_A}$.

For type B CSI, $\beta = \beta^{CSI\_B}$.

C' is the virtual number of code blocks $K'_r$ is the virtual r-th code block size including CRC parity bits $M_{max}$, represents a maximum value of the coded modulation symbols for the HARQ-ACK, the type A CSI, or the type B CSI. $M_{max}$ for the HARQ-ACK may be the same as or different from $M_{max}$ for the type A CSI. $M_{max}$ for the HARQ-ACK may be the same as or different from $M_{max}$ for the type B CSI. $M_{max}$ for the type A CSI may be the same as or different from $M_{max}$ for the type B CSI.

$M_{max}$ for the HARQ-ACK or the type A CSI may be given at least based on $M_{sc}$, the frequency density B of the PTRS, and whether or not the PTRS is mapped to an OFDM symbol (SC-FDMA symbol) to which the coded modulation symbol for the HARQ-ACK or the type A CSI is mapped.

$M_{max}$ for the type B CSI may be given at least based on a part or all of $M_{sc}$, $N_{symb}$, the frequency density B of the PTRS, whether or not the PTRS is mapped to an OFDM symbol (SC-FDMA symbol) to which the coded modulation symbol for the HARQ-ACK or the type A CSI is mapped, the modulation order $Q_m$, the number $Q'_{ACK}$ of coded modulation symbols for the HARQ-ACK, the number $Q_{ACK}$ of coded bits of the HARQ-ACK, the number $Q'_{CSI\_A}$ of coded modulation symbols for the type A CSI, and the number $Q_{CSI\_A}$ of coded bits of the type A CSI. In a case that the coded modulation symbol for the transport block is mapped to an element except the element to which the coded modulation symbol for the HARQ-ACK is mapped, $M_{max}$ for the type B CSI may be given at least based on the number $Q'_{ACK}$ of coded modulation symbols for the HARQ-ACK or the number $Q_{ACK}$ of coded bits of the HARQ-ACK. In a case that the coded modulation symbol for the transport block is mapped to the element to which the coded modulation symbol for the HARQ-ACK is mapped, $M_{max}$ for the type B CSI may be given without using any of the number $Q'_{ACK}$ of coded modulation symbols for the HARQ-ACK and the number $Q_{ACK}$ of coded bits of the HARQ-ACK.

The base station apparatus 3 may transmit, to the terminal apparatus 1, information including an RRC layer parameter indicating $\beta^{HARQ\text{-}ACK}$, the RRC layer parameter indicating $\beta^{CSI\_A}$, and the RRC layer parameter indicating $\beta^{CSI\_B}$.

It is not preferable to use TBS to calculate Q' that is used determine the transport block size TBS. Therefore, in Equation (4), the virtual number C' of code blocks calculated based on a virtual transport block size $TBS^{virtual}$, and a virtual r-th code block size $K'_r$ including CRC parity bits are used. In other words, C' and $K'_r$ are C and $K_r$, respectively, that are calculated based on the virtual transport block size $TBS^{virtual}$, instead of the transport block size TBS.

The terminal apparatus 1 and the base station apparatus 3 may determine the virtual transport block size $TBS^{virtual}$, out of a set of transport block size candidates. As the virtual transport block size $TBS^{virtual}$, the terminal apparatus 1 and the base station apparatus 3 may select a transport block size candidate that is larger than a virtual temporary transport block size $TBS^{virtual}_{temp}$ and that has the smallest value. As the virtual transport block size $TBS^{virtual}$, the terminal apparatus 1 and the base station apparatus 3 may select a transport block size candidate that is smaller than the virtual temporary transport block size $TBS^{virtual}_{temp}$ and that has the largest value.

The virtual temporary transport block size $TBS^{virtual}_{temp}$ may be given according to Equation (5). The virtual temporary transport block size $TBS^{virtual}_{temp}$ may be given at least based on the modulation order $Q_m$, the target coding rate R, the virtual number $N^{virtual}_{RE}$ of resource elements, and the number v of layers. In other words, the virtual transport block size $TBS^{virtual}$ may be given at least based on the modulation order $Q_m$, the target coding rate R, the virtual number $N^{virtual}_{RE}$ of resource elements, and the number v of layers.

$$TBS_{temp}^{virtual} = Q_m \cdot R \cdot N_{RE}^{virtual} \cdot v \quad \text{Equation 5}$$

wherein $N_{RE}^{virtual}$ is the number of the virtual allocated REs

The virtual number $N^{virtual}_{RE}$ of resource elements may be given according to Equation (6). In other words, $(N_{SC\_initial} \cdot N_{symb\_initial} - N_{PTRS\_initial})$ in Equation 4 may be replaced with the virtual number $N^{virtual}_{RE}$ of resource elements.

$$N_{RE}^{virtual} = M_{SC\_initial} \cdot N_{symb\_initial} - N_{PTRS\_initial} \quad \text{Equation 6}$$

The number $N_{RE}$ of allocated resource elements is given based on $Q'_{ACK}$, $Q'_{CSI\_A}$, and/or $Q'_{CSI\_B}$; however, the virtual number $N^{virtual}_{RE}$ of resource elements is given regardless of $Q'_{ACK}$, $Q'_{CSI\_A}$, and $Q'_{CSI\_B}$.

In other words, $Q'_{ACK}$, $Q'_{CSI\_A}$, and/or $Q'_{CSI\_B}$ that are necessary for calculating the transport block size TBS and the temporary transport block size $TBS_{temp}$ may be given at least based on the virtual transport block size $TBS_{virtual}$ calculated without using $Q'_{ACK}$, $Q'_{CSI\_A}$, and $Q'_{CSI\_B}$ and the virtual temporary transport block size $TBS^{virtual}_{temp}$.

Figure 13:
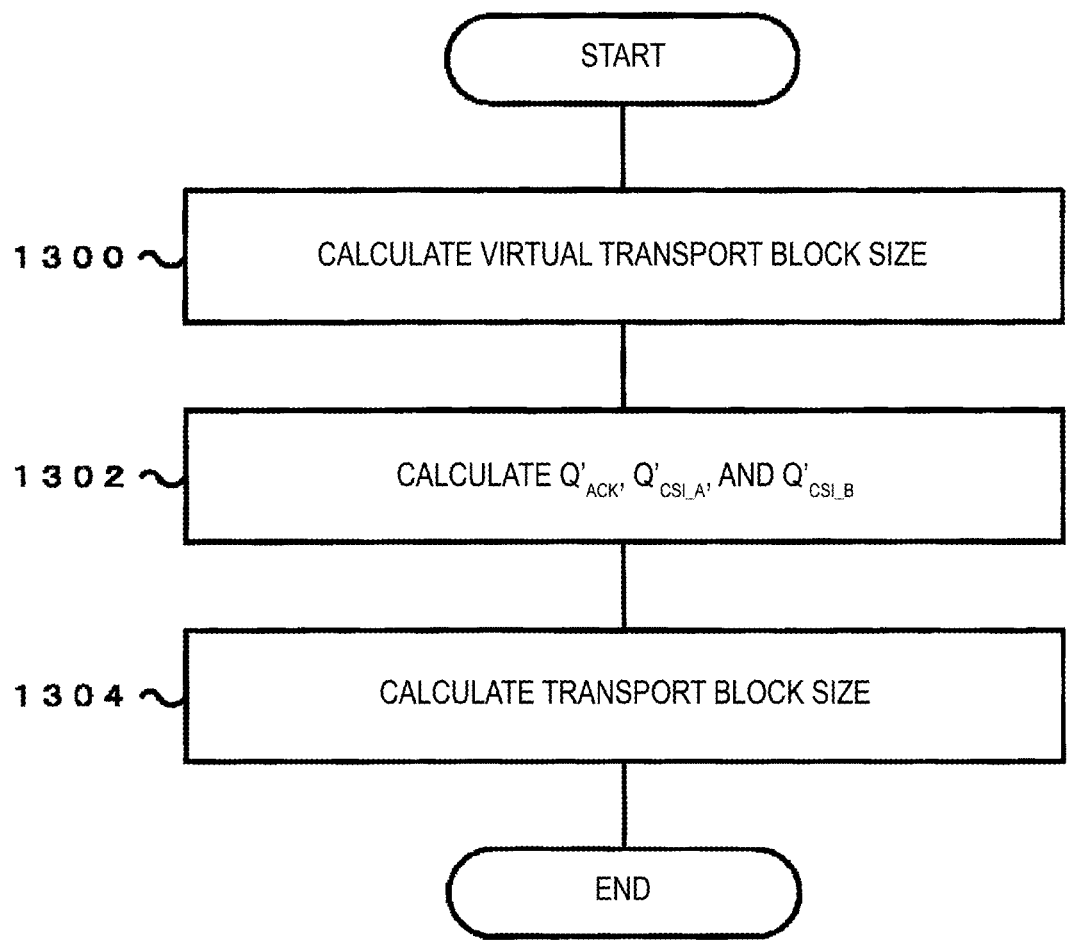
FIG. 13 is a diagram illustrating a flow for calculating the transport block according to the present embodiment.

FIG. 13 is a diagram illustrating a flow for calculating the transport block according to the present embodiment. In 1300, the terminal apparatus 1 and the base station apparatus 3 calculate the virtual transport block size $TBS^{virtual}$, without using $Q'_{ACK}$, $Q'_{CSI\_A}$, and $Q'_{CSI\_B}$. In 1302, the terminal apparatus 1 and the base station apparatus 3 calculate $Q'_{ACK}$, $Q'_{CSI\_A}$, and/or $Q'_{CSI\_B}$, by using the virtual transport block size $TBS^{virtual}$. In 1304, the terminal apparatus 1 and the base station apparatus 3 calculate the transport block size TBS, by using $Q'_{ACK}$, $Q'_{CSI\_A}$, and/or $Q'_{CSI\_B}$.

The number $Q'_{ACK}$ of coded modulation symbols for the HARQ-ACK may be given according to Equation (7). The number $Q'_{CSI\_A}$ of coded modulation symbols for the type A CSI may be given according to Equation (7). The number $Q'_{CSI\_A}$ of coded modulation symbols for the type B CSI may be given according to Equation (7). In other words, for the HARQ-ACK, the number Q' of coded modulation symbols in Equation (7) may be replaced with $Q'_{ACK}$. For the type A CSI, the number Q' of coded modulation symbols in Equation (7) may be replaced with $Q'_{CSI\_A}$. For the type B CSI, the number Q' of coded modulation symbols in Equation (7) may be replaced with $Q'_{CSI\_B}$.

$$Q' = \min\left\{\operatorname{ceil}\left(\frac{(O+L)\cdot \beta}{Q_m \cdot R}\right), M_{max}\right\} \quad \text{Equation 7}$$

wherein

O is the number of HARQ-ACK bits or type A CSI bits or type B CSI bits

L is the number of CRC parity bits for HARQ-ACK or type A CSI or type B CSI

For HARQ-ACK, $\beta = \beta^{HARQ\text{-}ACK}$.

For type A CSI, $\beta = \beta^{CSI\_A}$.

For type B CSI, $\beta = \beta^{CSI\_B}$.

Hereinafter, various aspects of the terminal apparatus 1 and the base station apparatus 3 according to the present embodiment will be described.

(1) A first aspect of the present embodiment is a terminal apparatus 1 including: a coding unit configured to separately encode a HARQ-ACK, CSI, and a transport block; and a transmitter configured to transmit the HARQ-ACK, the CSI, and the transport block by using a PUSCH, wherein the coding unit calculates a number $Q'_{ACK}$ of first coded modulation symbols for the HARQ-ACK and a number $Q'_{CSI}$ of second coded modulation symbols for the CSI, and calculates a size of the transport block without using the number $Q'_{ACK}$ of first coded modulation symbols and at least based on the number $Q'_{CSI}$ of second coded modulation symbols.

(2) In the first aspect of the present embodiment, the coding unit overwrites a part of coded modulation symbols for the transport block with the first coded modulation symbol(s).

(3) In the first aspect of the present embodiment, in a case that the coded modulation symbols for the transport block is overwritten by the first coded modulation symbol(s), the coding unit calculates the size of the transport block without using the number $Q'_{ACK}$ of first coded modulation symbols and at least based on the number $Q'_{CSI}$ of second coded modulation symbols, and in a case that the coded modulation symbols for the transport block is mapped to a coded modulation symbol except the coded modulation symbols for the HARQ-ACK, the coding unit calculates the size of the transport block, at least based on the number $Q'_{ACK}$ of first coded modulation symbols and the number $Q'_{CSI}$ of second coded modulation symbols.

(4) A second aspect of the present embodiment is a terminal apparatus 1 including: a coding unit configured to separately encode uplink control information and a transport block; and a transmitter configured to transmit the uplink control information and the transport block by using a PUSCH, wherein the coding unit calculates a virtual transport block size $TBS^{virtual}$ without using a number Q' of coded modulation symbols for the uplink control information, calculates the number Q' of coded modulation symbols, at least based on the virtual transport block size $TBS^{virtual}$, and calculates a size TBS of the transport block, at least based on the number Q' of coded modulation symbols.

(6) A third aspect of the present embodiment is a terminal apparatus 1 including: a receiver configured to receive a PDCCH including downlink control information; a coding unit configured to separately encode uplink control information and a transport block; and a transmitter configured to transmit the uplink control information and the transport block by using a PUSCH, wherein the downlink control information indicates a target coding rate R and a modulation order $Q_m$, and the coding unit calculates a number Q' of coded modulation symbols for the uplink control information, at least based on the target coding rate R and the modulation order $Q_m$, and calculates a size of the transport block, at least based on the target coding rate R, the modulation order Qm, and the number Q' of coded modulation symbols.

(7) A fourth aspect of the present embodiment is a base station apparatus 3 including: a decoding unit configured to separately decode a HARQ-ACK, CSI, and a transport block; and a receiver configured to receive the HARQ-ACK, the CSI, and the transport block by using a PUSCH, wherein the decoding unit calculates a number $Q'_{ACK}$ of first coded modulation symbols for the HARQ-ACK and a number $Q'_{CSI}$ of second coded modulation symbols for the CSI, and calculates a size of the transport block without using the number $Q'_{ACK}$ of first coded modulation symbols and at least based on the number $Q'_{CSI}$ of second coded modulation symbols.

(8) A fifth aspect of the present embodiment is a base station apparatus 3 including: a decoding unit configured to separately decode uplink control information and a transport block; and a receiver configured to receive the uplink control information and the transport block by using a PUSCH, wherein the decoding unit calculates a virtual transport block size $TBS^{virtual}$ without using a number Q' of coded modulation symbols for the uplink control information, calculates the number Q' of coded modulation symbols, at least based on the virtual transport block size $TBS^{virtual}$, and calculates a size TBS of the transport block, at least based on the number Q' of coded modulation symbols.

(9) A sixth aspect of the present embodiment is a base station apparatus 3 including: a transmitter configured to transmit a PDCCH including downlink control information; a decoding unit configured to separately decode uplink control information and a transport block; and a receiver configured to receive the uplink control information and the transport block by using a PUSCH, wherein the downlink control information indicates a target coding rate R and a modulation order $Q_m$, and the decoding unit calculates a number Q' of coded modulation symbols for the uplink control information, at least based on the target coding rate R and the modulation order $Q_m$, and calculates a size of the transport block, at least based on the target coding rate R, the modulation order $Q_m$, and the number Q' of coded modulation symbols.

(10) In the second, third, fifth, or sixth aspect of the present embodiment, the uplink control information is a HARQ-ACK.

(11) In the second, third, fifth, or sixth aspect of the present embodiment, the uplink control information is CSI.

(12) In the second, third, fifth, or sixth aspect of the present embodiment, the number Q' of coded modulation symbols for the uplink control information may be the number $Q'_{ACK}$ of coded modulation symbols for the HARQ-ACK or the number $Q'_{CSI}$ of coded modulation symbols for the CSI. The number Q' of coded modulation symbols for the uplink control information may be a sum of the number $Q'_{ACK}$ of coded modulation symbols for the HARQ-ACK and the number $Q'_{CSI}$ of coded modulation symbols for the CSI.

(A1) One aspect of the present invention is a terminal apparatus including: a receiver configured to receive a PDCCH including downlink control information used for scheduling of a PUSCH; a coding unit configured to encode uplink control information; and a transmitter configured to transmit the uplink control information by using the PUSCH, wherein a coding rate R and a modulation order $Q_m$ are given based on one field included in the downlink control information, the number Q of coded bits of the uplink control information is given at least based on the number Q' of coded modulation symbols for the uplink control information and the modulation order $Q_m$, and the number Q' of coded modulation symbols is given at least based on the coding rate R and the modulation order $Q_m$.

(A2) One aspect of the present invention is the terminal apparatus 1, wherein the number Q' of coded modulation symbols is given at least based on a following value, where O is the number of bits of the uplink control information, L is the number of CRC parity bits for the uplink control information, and β is given based on an RRC layer parameter.

$$\text{ceil}\left(\frac{(O+L)\cdot\beta}{Q_m\cdot R}\right) \qquad \text{Expression 8}$$

(A3) One aspect of the present invention is the terminal apparatus 1, wherein the number Q' of coded modulation symbols is given based on a following equation.

$$Q' = \min\left\{\text{ceil}\left(\frac{(O+L)\cdot\beta}{Q_m\cdot R}\right), M_{max}\right\} \qquad \text{[Equation 9]}$$

(A4) One aspect of the present invention is the terminal apparatus 1, wherein the $M_{max}$ is given at least based on $M_{SC}$, and the $M_{SC}$, expressed as a number of subcarriers, represents a bandwidth scheduled for transmission of the PUSCH.

(A5) One aspect of the present invention is the terminal apparatus 1, wherein the $M_{max}$ is a maximum value of the coded modulation symbols for the uplink control information.

(A6) One aspect of the present invention is the terminal apparatus 1, wherein the uplink control information is a HARQ-ACK.

(A7) One aspect of the present invention is the terminal apparatus 1, wherein the uplink control information is CSI.

(A8) One aspect of the present invention is a base station apparatus 3 including: a transmitter configured to transmit a PDCCH including downlink control information used for scheduling of a PUSCH; a receiver configured to receive uplink control information by using the PUSCH; and a decoding unit configured to decode the uplink control information, wherein a coding rate R and a modulation order $Q_m$ are given based on one field included in the downlink control information, the number Q of coded bits of the uplink control information is given at least based on the number Q' of coded modulation symbols for the uplink control information and the modulation order $Q_m$, and the number Q' of coded modulation symbols is given at least based on the coding rate R and the modulation order $Q_m$.

(A9) One aspect of the present invention is the base station apparatus 3, wherein the number Q' of coded modulation symbols is given at least based on a following value, where O is the number of bits of the uplink control information, L is the number of CRC parity bits for the uplink control information, and β is given based on an RRC layer parameter.

$$\text{ceil}\left(\frac{(O+L)\cdot\beta}{Q_m\cdot R}\right) \qquad \text{Expression 8}$$

(A10) One aspect of the present invention is the base station apparatus 3, wherein the number Q' of coded modulation symbols is given based on a following equation.

$$Q' = \min\left\{\text{ceil}\left(\frac{(O+L)\cdot\beta}{Q_m\cdot R}\right), M_{max}\right\} \qquad \text{[Equation 9]}$$

(A11) One aspect of the present invention is the base station apparatus 3, wherein the $M_{max}$ is given at least based on $M_{SC}$, and the $M_{SC}$, expressed as a number of subcarriers, represents a bandwidth scheduled for transmission of the PUSCH.

(A12) One aspect of the present invention is the base station apparatus 3, wherein the $M_{max}$ is a maximum value of the coded modulation symbols for the uplink control information.

(A13) One aspect of the present invention is the base station apparatus 3, wherein the uplink control information is a HARQ-ACK.

(A14) One aspect of the present invention is the base station apparatus 3, wherein the uplink control information is CSI.

(A15) One aspect of the present invention is a communication method used for a terminal apparatus 1, the communication method including: receiving a PDCCH including downlink control information used for scheduling of a PUSCH; encoding uplink control information; and transmitting the uplink control information by using the PUSCH, wherein a coding rate R and a modulation order $Q_m$ are given based on one field included in the downlink control information, the number Q of coded bits of the uplink control information is given at least based on the number Q' of coded modulation symbols for the uplink control information and the modulation order $Q_m$, and the number Q' of coded modulation symbols is given at least based on the coding rate R and the modulation order $Q_m$.

(A16) One aspect of the present invention is a communication method used for a base station apparatus 3, the communication method including: transmitting a PDCCH including downlink control information used for scheduling of a PUSCH; receiving uplink control information by using the PUSCH; and decoding the uplink control information, wherein a coding rate R and a modulation order $Q_m$ are given based on one field included in the downlink control information, the number Q of coded bits of the uplink control information is given at least based on the number Q' of coded modulation symbols for the uplink control information and the modulation order $Q_m$, and the number Q' of coded modulation symbols is given at least based on the coding rate R and the modulation order $Q_m$.

According to the above, the terminal apparatus 1 and the base station apparatus 3 can efficiently determine the size of information, and/or the number of modulation symbols/coded symbols/resource elements for the information.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
reception circuitry configured or programmed to receive a Physical Downlink Control Channel (PDCCH) including downlink control information, the downlink control information being used for scheduling of a Physical Uplink Shared Channel (PUSCH);
encoding circuitry configured or programmed to encode first uplink information and second uplink information; and
transmission circuitry configured or programmed to transmit encode bits of the first uplink information and encode bits of the second uplink information using the PUSCH, wherein
a target code rate and a modulation order are indicated in a field included in the downlink control information, and
a number of coded modulation symbols for the first uplink information is given by using a value of $$\operatorname{ceil}\left(\frac{(O+L)\cdot \beta}{Q_m \cdot R}\right),$$

O is a number of bits for the first uplink information,
L is a number of Cyclic Redundancy Check (CRC) parity bits,
$\beta$ is given based on a Radio Resource Control (RRC) parameter,
$Q_m$ is the modulation order,
R is the target code rate, and
a size of the second uplink information is given by using the target coding rate and the number of coded modulation symbols for the first uplink information.

2. The terminal apparatus according to claim 1, wherein the number of coded modulation symbols is given by an equation of $$Q' = \min\left\{\operatorname{ceil}\left(\frac{(O+L)\cdot \beta}{Q_m \cdot R}\right), M_{max}\right\},$$

and
$M_{max}$ is given based on at least a density of a Phase Tracking Reference Signal (PTRS).

3. The terminal apparatus according to claim 2, wherein the density of the PTRS is given by using a bandwidth scheduled for a transmission of the PUSCH.

4. A base station apparatus comprising:
transmission circuitry configured or programmed to transmit a Physical Downlink Control Channel (PDCCH) including downlink control information, the downlink control information being used for scheduling of a Physical Uplink Shared Channel (PUSCH);
reception circuitry configured or programmed to receive encode bits of first uplink information and encode bits of second uplink information using the PUSCH; and
decoding circuitry configured or programmed to decode the first uplink information and the second uplink information, wherein
a target code rate and a modulation order are indicated in a field included in the downlink control information, and
a number of coded modulation symbols for the first uplink information is given by using a value of $$\operatorname{ceil}\left(\frac{(O+L)\cdot \beta}{Q_m \cdot R}\right),$$

O is a number of bits for the first uplink information,
L is a number of Cyclic Redundancy Check (CRC) parity bits,
$\beta$ is given based on a Radio Resource Control (RRC) parameter,
$Q_m$ is the modulation order,
R is the target code rate, and
a size of the second uplink information is given by using the target coding rate and the number of coded modulation symbols for the first uplink information.

5. The base station apparatus according to claim 4, wherein
the number of coded modulation symbols is given by an equation of $$Q' = \min\left\{\operatorname{ceil}\left(\frac{(O+L)\cdot \beta}{Q_m \cdot R}\right), M_{max}\right\},$$

and
$M_{max}$ is given based on at least a density of a Phase Tracking Reference Signal (PTRS).

6. The base station apparatus according to claim 5, wherein
the density of the PTRS is given by using a bandwidth scheduled for a transmission of the PUSCH.

7. A communication method for a terminal apparatus, comprising:
receiving a Physical Downlink Control Channel (PDCCH) including downlink control information, the downlink control information being used for scheduling of a Physical Uplink Shared Channel (PUSCH);
encoding first uplink information and second uplink information; and
transmitting encode bits of the first uplink information and encode bits of the second uplink information using the PUSCH, wherein
a target coding rate and a modulation order are indicated in a field included in the downlink control information, and
a number of coded modulation symbols for the first uplink information is given by using a value of $$\operatorname{ceil}\left(\frac{(O+L)\cdot \beta}{Q_m \cdot R}\right),$$

O is a number of bits for the first uplink information,
L is a number of Cyclic Redundancy Check (CRC) parity bits,
$\beta$ is given based on a Radio Resource Control (RRC) parameter,
$Q_m$ is the modulation order,
R is the coding rate, and
a size of the second uplink information is given by using the target coding rate and the number of coded modulation symbols for the first uplink information.

8. The communication method according to claim 7, wherein the number of coded modulation symbols is given by an equation of $$Q' = \min\left\{\text{ceil}\left(\frac{(O+L)\cdot\beta}{Q_m \cdot R}\right), M_{max}\right\},$$

and $M_{max}$ is given based on at least a density of a Phase Tracking Reference Signal (PTRS).

9. The communication method according to claim 8, wherein the density of the PTRS is given by using a bandwidth scheduled for a transmission of the PUSCH.

10. A communication method for a base station apparatus, comprising:

transmitting a Physical Downlink Control Channel (PDCCH) including downlink control information, the downlink control information being used for scheduling of a (Physical Uplink Shared Channel) PUSCH;

receiving encode bits of first uplink information and encode bits of second uplink information using the PUSCH; and decoding the first uplink information and the second uplink information, wherein a target coding rate and a modulation order are indicated in a field included in the downlink control information, and a number of coded modulation symbols for the first uplink information is given by using a value of $$\text{ceil}\left(\frac{(O+L)\cdot\beta}{Q_m \cdot R}\right),$$

O is a number of bits for the first uplink information,

L is a number of Cyclic Redundancy Check (CRC) parity bits,

β is given based on a Radio Resource Control (RRC) parameter, $Q_m$ is the modulation order, R is the target coding rate, and a size of the second uplink information is given by using the target coding rate and the number of coded modulation symbols for the first uplink information.

11. The communication method according to claim 10, wherein the number of coded modulation symbols is given by an equation of $$Q' = \min\left\{\text{ceil}\left(\frac{(O+L)\cdot\beta}{Q_m \cdot R}\right), M_{max}\right\},$$

and $M_{max}$ is given based on at least a density of a Phase Tracking Reference Signal (PTRS).

12. The communication method according to claim 11, wherein the density of the PTRS is given by using a bandwidth scheduled for a transmission of the PUSCH.

* * * * *